US010400731B2

(12) United States Patent
Weiss et al.

(10) Patent No.: US 10,400,731 B2
(45) Date of Patent: Sep. 3, 2019

(54) METHOD AND DEVICE FOR DIAGNOSING A FUEL DELIVERY SYSTEM

(71) Applicant: Robert Bosch GmbH, Stuttgart (DE)

(72) Inventors: Patrick Weiss, Remseck am Neckar (DE); Yiping Chen, JiangSu (CN)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 15/536,202

(22) PCT Filed: Nov. 3, 2015

(86) PCT No.: PCT/EP2015/075538
§ 371 (c)(1),
(2) Date: Jun. 15, 2017

(87) PCT Pub. No.: WO2016/096229
PCT Pub. Date: Jun. 23, 2016

(65) Prior Publication Data

US 2017/0350359 A1 Dec. 7, 2017

(30) Foreign Application Priority Data

Dec. 19, 2014 (DE) ........................ 10 2014 226 565

(51) Int. Cl.
*G01M 15/04* (2006.01)
*F02M 65/00* (2006.01)
(Continued)

(52) U.S. Cl.
CPC ......... *F02M 65/003* (2013.01); *F02D 41/221* (2013.01); *F02D 41/3809* (2013.01);
(Continued)

(58) Field of Classification Search
USPC ................ 73/114.38, 114.41, 114.42, 114.43
See application file for complete search history.

(56) References Cited

U.S. PATENT DOCUMENTS 7,040,291 B2 * 5/2006 Veit .................... F02D 41/3845 123/458
2012/0239272 A1 9/2012 Hackner et al.
2017/0254307 A1 * 9/2017 Hoss ................. F02M 63/0052

FOREIGN PATENT DOCUMENTS

CN 101014764 A 8/2007
CN 101349230 A 1/2009
(Continued)

OTHER PUBLICATIONS

International Search Report for Application No. PCT/EP2015/075538 dated Apr. 5, 2016 (English Translation, 2 pages).

*Primary Examiner* — Eric S. McCall
(74) *Attorney, Agent, or Firm* — Michael Best & Friedrich LLP

(57) ABSTRACT

The invention relates to a method for testing an electrically activated actuator in a fuel delivery device (10) of an internal combustion engine, wherein the electrical actuator is a controllable valve (15) that is arranged on the inlet side of a high-pressure pump (16). The high-pressure pump (16) conveys fuel into a fuel store (17) having a pressure controller (20). The fuel store (17) is connected to at least one injector (23). The method comprises the following steps: 1) increasing the rotational speed of the high-pressure pump (16), 2) activating the controllable valve (15) until the pressure in the fuel store (17) has reached a first low pressure level, 3) changing the supply of current to the controllable valve (15) by a first specified value such that the controllable valve (15) is opened further and simultaneously maximizing an injection amount by means of the at least one injector (23) until the pressure in the fuel store (17) has reached a first threshold value, 4) activating the controllable valve (15) until the pressure in the fuel store (17) has reached the first low pressure level again, 5) determining a further quantity,
(Continued)

which depends on the low pressure level and a maximum value of the pressure that was reached in the fuel store (17).

12 Claims, 2 Drawing Sheets

(51) Int. Cl.
*F02M 63/02* (2006.01)
*F02D 41/22* (2006.01)
*F02D 41/38* (2006.01)
*F02D 41/26* (2006.01)

(52) U.S. Cl.
CPC ....... *F02D 41/3845* (2013.01); *F02M 63/023* (2013.01); *F02D 41/266* (2013.01); *F02D 2041/224* (2013.01); *F02D 2200/0602* (2013.01)

(56) References Cited

FOREIGN PATENT DOCUMENTS

| | | |
|---|---|---|
| DE | 10354656 | 6/2005 |
| DE | 102011005527 | 9/2012 |
| EP | 1118761 | 7/2001 |
| EP | 1279822 | 1/2003 |

* cited by examiner

METHOD AND DEVICE FOR DIAGNOSING A FUEL DELIVERY SYSTEM

BACKGROUND OF THE INVENTION

The present invention relates to a method for testing a fuel delivery device, in particular an electrically activated actuator, and to a control unit and a workshop tester.

DE 103 54 656 A1 describes a method for monitoring an injection system of an internal combustion engine. The injection system comprises a fuel accumulator and a controlled metering unit for controlling the fuel delivery quantity in the fuel accumulator. Known methods of this type evaluate a signal, which represents the variation over time of the pressure in the fuel accumulator, with respect to a possible defect of a component of the injection system. In order to be able to specifically infer a defect of the metering unit, the metering unit is increasingly closed or opened during the evaluation of the signal representing the pressure in the fuel accumulator.

One further method for testing the fuel quantity balance in a common rail system having two electrically activated actuators is described in DE 10 2011 005 527 A1.

SUMMARY OF THE INVENTION

One problem addressed by the invention is that of providing a method for testing a fuel delivery device, in particular an electrically activated actuator of a fuel delivery device. Conventional testing methods offer the possibility of testing a dual-actuator system, which comprises a first electrically activated actuator upstream of the high-pressure pump and a pressure control valve at the high-pressure accumulator, with respect to a defect of the first electrical actuator. In this case, the first electrically activated actuator can be checked for all possible operating points, since excess fuel can be gradually reduced via the pressure control valve.

Since this possibility does not exist in a single-actuator system without a pressure control valve, the electrically activated actuator can so far only be tested within a limited operating range in the state in which said actuator is installed in the vehicle. If faults occur outside of this operating range, this cannot be diagnosed in the workshop. In order to avoid the situation in which a fault is not correctly detected, the method according to the invention offers the possibility of testing the electrically activated actuator in all operating ranges.

In addition, a control unit for carrying out the method according to the invention is claimed, as well as an engine tester which requests the method according to the invention on a control unit.

The method according to the invention includes the following steps of:

Increasing the rotational speed of the high-pressure pump.

Activating the controllable valve until the pressure in the fuel accumulator has reached a first low pressure level.

Changing the supply of current to the controllable valve by a first specified value such that the controllable valve is opened further, and simultaneously maximizing an injection quantity by means of the at least one injector until the pressure in the fuel accumulator has reached a first threshold value.

Activating the controllable valve until the pressure in the fuel accumulator has reached the first low pressure level again.

Determining a further quantity which depends on the low pressure level and a maximum value of the pressure that was reached in the fuel accumulator.

It is advantageous when the further quantity is the pressure difference between the first low pressure level and a maximum value of the pressure, or when the further quantity is the time required until the pressure has increased from the first low pressure level to the maximum value of the pressure. Both quantities can be described for the controllable valve in a characteristic map, and therefore said quantities can be easily and reliably reproduced for a functional, controllable valve.

A deviation of the pressure difference and/or the time from the particular stored characteristic map indicates a fault in the controllable valve in a simple and advantageous manner. The controllable valve does not need to be removed in order to check for a fault, which saves time as well as costs in the workshop.

Repeating steps 1.) through 5.) multiple times during a check of the controllable valve is advantageous since the repetition increases the accuracy of the test, and a fault that occurs with lesser probability is detected. In this case, the possibility to supply current to the controllable valve each time with the same value, which corresponds to the first specified value, is a simple mode of testing.

In the case of multiple repetitions, it is advantageous to carry out a comparison of the further quantity between the repetitions, since the further quantity should not exhibit a change, provided the basic conditions remain the same. In this way, a fault of the controllable valve can be easily detected even without a characteristic map.

A multiple repetition of steps 1.) through 5), wherein the supply of current to the controllable valve is changed by another value each time, is advantageous since a larger bandwidth of operating states can be tested and, therefore, there is a greater probability of finding a fault that may occur only in a certain operating state. A simple possibility in this case is to change the supply of current by the same absolute amount in each repetition.

Typically, the pressure in the fuel accumulator is set for the method steps 2.) and 4.) via the pressure controller which delivers information to the control unit regarding the pressure in the fuel accumulator, and therefore the said control unit activates the controllable valve accordingly.

Within the scope of this application, the term “control” or “activate” is used for the terms “control” and “regulate” known in control engineering.

In order to increase accuracy, functions that can corrupt the result of the method according to the invention can be advantageously blocked.

BRIEF DESCRIPTION OF THE DRAWINGS

Preferred exemplary embodiments of the invention are depicted in the drawing and are described in greater detail in the following description.

In the drawings.

DETAILED DESCRIPTION

Figure 1:
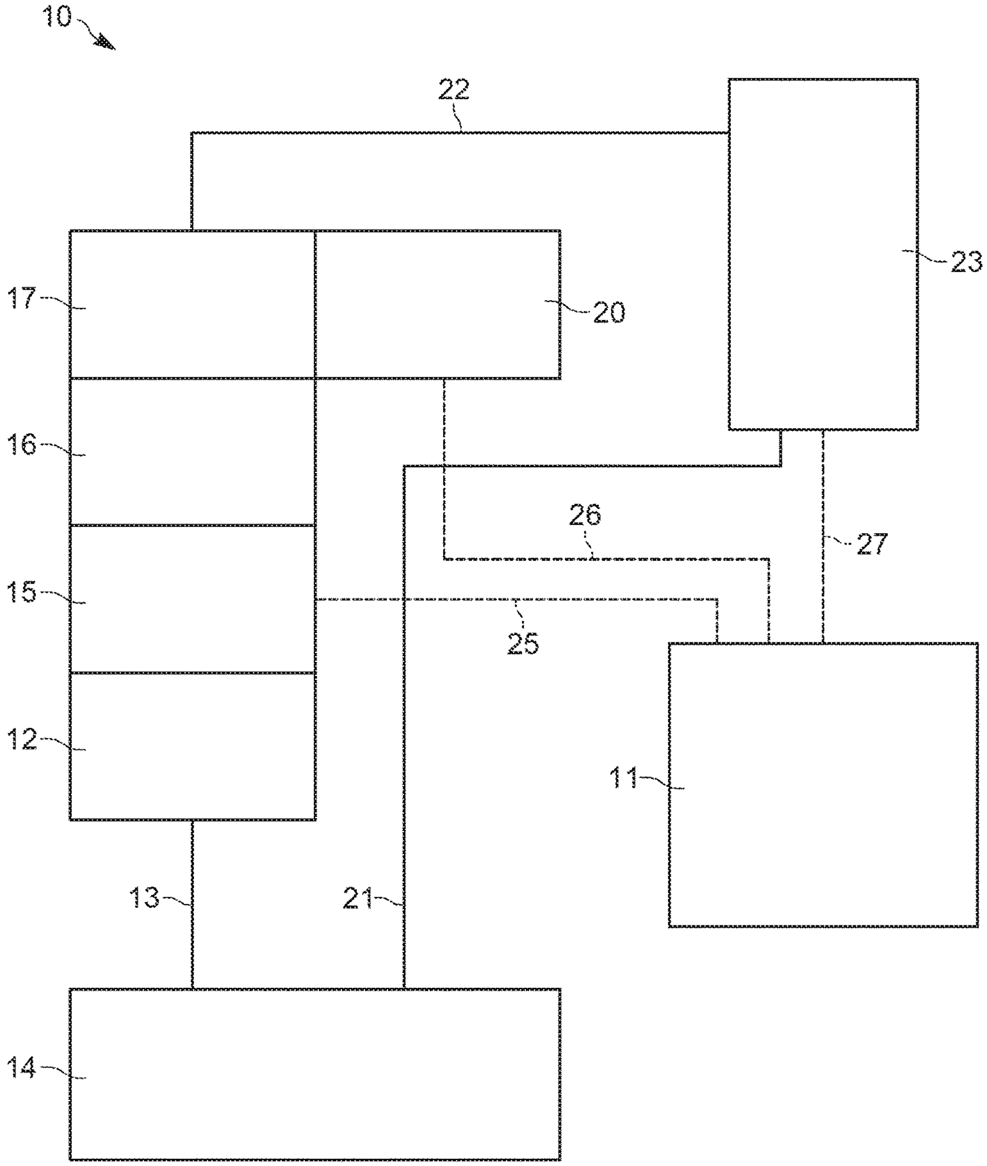
FIG. 1 shows a schematic depiction of a fuel delivery device.

FIG. 1 shows a schematic depiction of a fuel delivery device 10 comprising a control unit 11 according to one embodiment of the present invention. Only those components that are important for understanding the invention are shown.

A pre-feed pump 12 draws fuel out of a tank 14 via a supply line 13. The pre-feed pump 12 supplies a controllable valve 15 with fuel. The controllable valve 15 controls the fuel quantity fed to a high-pressure pump 16. The high-pressure pump 16 conveys the fuel fed thereto into the fuel accumulator 17 under high pressure. In the fuel accumulator 17, the pressure is controlled by a pressure controller 20.

The fuel in the fuel accumulator 17 is then fed via a high-pressure line 22 to at least one injector 23 which injects fuel into at least one cylinder (not shown) of an internal combustion engine. A fuel quantity required for the operation of the injectors 23 is likewise returned to the tank 14 via a fuel return line 21.

A control unit 11 activates the controllable valve 15 via an electrical control line 25. In addition, the control unit 11 receives, via an electrical control line 26, the pressure in the fuel accumulator 17, which is measured by the pressure controller 20. The control unit 11 activates the injectors 23 via an electrical control line 27. The control unit 11 also contains software for controlling the engine during operation, and software for carrying out the method according to the invention for testing the controllable valve 15. The control of the engine takes place via electrical activation of the electrically activated actuator, namely the controllable valve 15, on the input side of the high-pressure pump 16.

Figure 2:
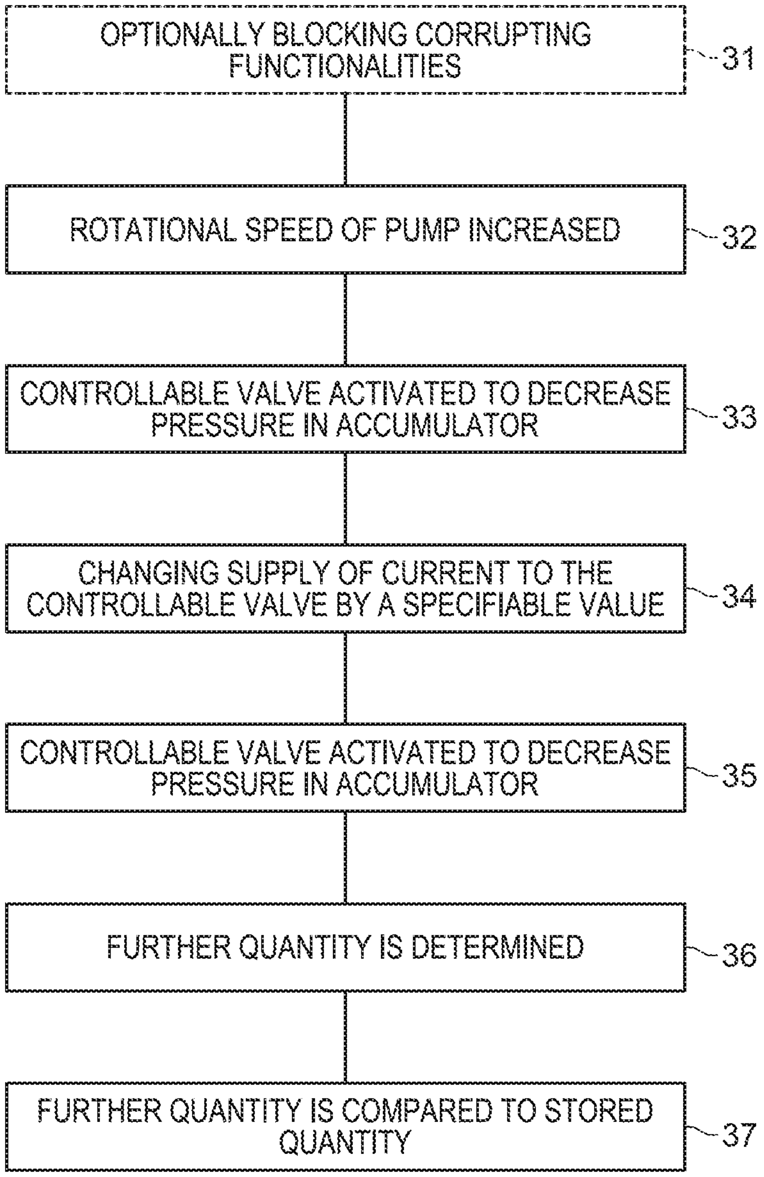
FIG. 2 shows a flow chart of the method according to one first exemplary embodiment of the present invention.

FIG. 2 shows a flow chart which describes the method according to the invention. The problem addressed by the method according to the invention is that of testing the electrically controlled actuator in a workshop without the need to remove the electrically activated actuator.

Before the actual method for testing begins, all the functionalities that can corrupt the result of the testing of the controllable valve 15 can be optionally blocked in method step 31. This can be, for example, a particle regenerator which is switched off during the testing.

In method step 32, the rotational speed of the high-pressure pump 16 is significantly increased in order to implement a high delivery quantity of the high-pressure pump 16 and a high injection quantity of the at least one injector 23. The increase in the rotational speed takes place in the workshop mode usually during idling. The method can also take place under a load, however, which must be identical during the entire method.

In the method step 33, the controllable valve 15 is activated in such a way that the pressure in the fuel accumulator 17 decreases until the pressure in the fuel accumulator 17 has reached a first low pressure level. The activation of the controllable valve 15 takes place via the control unit 11 which receives information via the pressure controller 20 regarding the pressure in the fuel accumulator 17. For this reason, the pressure in the method step 33 is set via the pressure controller 20.

In one further embodiment, it is possible that the pressure controller 20 is directly connected to the controllable valve 15 and said valve is activated until a desired pressure, which corresponds to the first low pressure level, is present in the fuel accumulator 17.

In the method step 34, the supply of current to the controllable valve 15 by the control unit 11 is changed by a first specifiable value, and therefore the controllable valve 15 is opened further. Depending on the type of controllable valve 15, the supply of current can be increased or decreased in this case, in order to achieve a further opening of the controllable valve 15. For example, a possible value of 50 mA can be used in this case, by which the current of the controllable valve 15 can be increased or decreased.

A maximization of an injection quantity by the at least one injector 23 takes place simultaneously in the method step 34. The changed supply of current to the controllable valve 15 and the maximization of the injection quantity of the at least one injector 23 are maintained until the pressure in the fuel accumulator 17 has reached a first threshold value.

In the method step 35, the controllable valve 15 is activated in such a way that the pressure in the fuel accumulator 17 decreases until the pressure in the fuel accumulator 17 has reached the first low pressure level. The activation of the controllable valve 15 takes place in the method step 35 similarly to the method step 33.

In the method step 36, a further quantity is determined, which is dependent on the first low pressure level and a maximum value of the pressure. The maximum value usually lies above the first threshold and is due to inertial effects of the fuel injection system 10. A closing of the controllable valve 15 does not result in an effect on the pressure in the fuel accumulator 17 until after a certain time delay, and therefore the pressure in the fuel accumulator 17 continues to increase even after the threshold has been reached, until the maximum value is reached.

The further quantity can be a pressure difference between the first low pressure level and the maximum value of the pressure. In one alternative embodiment, the further quantity can also be the time required until the pressure has increased from the first low pressure level to the maximum value of the pressure.

A comparison of the further quantity, which was determined in the method step 36 using a stored characteristic map of the further quantity of the controllable valve 15, takes place in the method step 37.

In one further alternative embodiment, it is also possible to form the pressure difference between the first low pressure level and the maximum value of the pressure, and to determine the time required until the pressure has increased from the first low level to the maximum value. Both the pressure difference and the time can then be compared to the particular characteristic map.

A deviation of the pressure difference and/or the time from the particular stored characteristic map can indicate a fault of the controllable valve 15.

If the controllable valve 15 has a fault, such as, for example, a sticking component, the measured pressure difference and/or the measured time do not match the stored characteristic curve.

The method steps 32 to 37 can be repeated multiple times, wherein the supply of current to the controllable valve 15 is changed each time by the same value which corresponds to the value specified in the first pass.

In this case, a comparison of the further quantity can take place between the particular repetitions. If the value of the further quantity deviates between the repetitions, even though the basic conditions were the same (for example, an identical change in the current supplied), there is a fault in the controllable valve 15.

Alternatively, it is possible to repeat the method steps 32 to 37 multiple times, wherein the supply of current to the controllable valve 15 is changed by another value each time. In this case, it is possible to change the supply of current by the same absolute amount in each repetition.

For example, in a first pass of the method steps 32 to 37, the current supply could be decreased or increased by 50 mA; in a second pass of the method steps 32 to 37, the current supply could be increased or decreased by 100 mA;

in a third pass of the method steps 32 to 37, the current supply could be decreased or increased by 150 mA, etc.

It is also possible to determine the difference of the pressure or the time after each of the passes. Alternatively, it is also possible, however, to repeat only the method steps 32 to 36 and to carry out an evaluation of the pressure differences and/or time of each pass at the end, in one common method step 37.

The method according to the invention is carried out by a control unit 11 which is connected to the controllable valve 15 and the pressure controller 20 via electrical control lines 25, 26. In addition, software and data regarding the characteristic map of the particular controllable valve are stored on the control unit 11.

The method according to the invention is requested by a workshop tester which can accommodate a connection to the control unit 11 via any type of interface. The results of the method according to the invention are transmitted to the workshop tester via the control unit 11.

The invention claimed is:

1. A method for testing an electrically activated actuator in a fuel delivery device (10) of an internal combustion engine, wherein the electrical actuator is a controllable valve (15) which is located on an inlet side of a high-pressure pump (16), wherein the high-pressure pump (16) conveys fuel into a fuel accumulator (17) having a pressure controller (20), and the fuel accumulator (17) is connected to at least one injector (23), the method comprising:

1.) increasing the rotational speed of the high-pressure pump (16);

2.) activating the controllable valve (15) until the pressure in the fuel accumulator (17) has reached a first low pressure level;

3.) changing a supply of current to the controllable valve (15) by a first specified value such that the controllable valve (15) is opened further, and simultaneously maximizing an injection quantity by means of the at least one injector (23) until the pressure in the fuel accumulator (17) has reached a first threshold value;

4.) activating the controllable valve (15) until the pressure in the fuel accumulator (17) has reached the first low pressure level again; and 5.) determining a further quantity which depends on the low pressure level and a maximum value of the pressure that was reached in the fuel accumulator (17).

2. The method as claimed in claim 1, wherein the further quantity is the pressure difference between the first low pressure level and a maximum value of the pressure.

3. The method as claimed in claim 1, wherein the further quantity is the time required until the pressure has increased from the first low pressure level to the maximum value of the pressure.

4. The method as claimed in claim 1, wherein the steps 1.) to 5.) are repeated multiple times and the supply of current to the controllable valve (15) is changed each time by the same value which corresponds to the first specified value, wherein a deviation of the further quantity between the repetitions indicates a fault in the controllable valve (15).

5. The method as claimed in claim 1, wherein the pressure-in step 2.) and 4.) is set via the pressure controller (20).

6. The method as claimed in claim 1, wherein functionalities that can corrupt the result of the method are blocked before step 1.).

7. The method as claimed in claim 1, further comprising 6.) comparing the further quantity to a stored characteristic map for the controllable valve (15) and wherein a deviation from the stored characteristic map indicates a fault.

8. The method as claimed in claim 7, wherein the steps 1.) to 6.) are-repeated multiple times, and the supply of current to the controllable valve (15) is changed each time by the same value which corresponds to the first specified value.

9. The method as claimed in claim 7, wherein the steps 1.) to 6.) are repeated multiple times, and the supply of current to the controllable valve (15) is changed each time by another absolute amount.

10. The method as claimed in claim 9, wherein the supply of current is increased or decreased by the same absolute amount in each repetition.

11. A control device (11) for testing an electrically activated actuator in a fuel delivery device (10) of an internal combustion engine, wherein the electrical actuator is a controllable valve (15) which is located on an inlet side of a high-pressure pump (16), wherein the high-pressure pump (16) conveys fuel into a fuel accumulator (17) having a pressure controller (20), and the fuel accumulator (17) is connected to at least one injector (23), the control device (11) configured to:

1.) increase the rotational speed of the high-pressure pump (16);

2.) activate the controllable valve (15) until the pressure in the fuel accumulator (17) has reached a first low pressure level;

3.)change a supply of current to the controllable valve (15) by a first specified value such that the controllable valve (15) is opened further, and simultaneously maximizing an injection quantity by means of the at least one injector (23) until the pressure in the fuel accumulator (17) has reached a first threshold value;

4.) activate the controllable valve (15) until the pressure in the fuel accumulator (17) has reached the first low pressure level again; and 5.) determine a further quantity which depends on the low pressure level and a maximum value of the pressure that was reached in the fuel accumulator (17).

12. A workshop tester configured to be connected to a control device (11) for testing an electrically activated actuator in a fuel delivery device (10) of an internal combustion engine, wherein the electrical actuator is a controllable valve (15) which is located on an inlet side of a high-pressure pump (16), wherein the high-pressure pump (16) conveys fuel into a fuel accumulator (17) having a pressure controller (20), and the fuel accumulator (17) is connected to at least one injector (23), the control device (11) configured to:

1.) increase the rotational speed of the high-pressure pump (16);

2.) activate the controllable valve (15) until the pressure in the fuel accumulator (17) has reached a first low pressure level;

3.) change a supply of current to the controllable valve (15) by a first specified value such that the controllable valve (15) is opened further, and simultaneously maximizing an injection quantity by means of the at least one injector (23) until the pressure in the fuel accumulator (17) has reached a first threshold value;

4.) activate the controllable valve (15) until the pressure in the fuel accumulator (17) has reached the first low pressure level again; and 5.) determine a further quantity which depends on the low pressure level and a maximum value of the pressure that was reached in the fuel accumulator (17).

* * * * *